US007418577B2

(12) United States Patent
Tremblay et al.

(10) Patent No.: US 7,418,577 B2
(45) Date of Patent: *Aug. 26, 2008

(54) FAIL INSTRUCTION TO SUPPORT TRANSACTIONAL PROGRAM EXECUTION

(75) Inventors: Marc Tremblay, Menlo Park, CA (US); Shailender Chaudhry, San Francisco, CA (US); Quinn A. Jacobson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/637,169

(22) Filed: Aug. 8, 2003

(65) Prior Publication Data

US 2004/0162968 A1   Aug. 19, 2004

Related U.S. Application Data

(60) Provisional application No. 60/447,128, filed on Feb. 13, 2003.

(51) Int. Cl.
*G06F 9/00* (2006.01)
(52) U.S. Cl. .................................. 712/218
(58) Field of Classification Search .............. 712/218
See application file for complete search history.

(56) References Cited

U.S. PATENT DOCUMENTS

| 5,428,761 | A | * | 6/1995 | Herlihy et al. .............. 711/130 |
| 5,701,432 | A | | 12/1997 | Wong et al. ................. 711/130 |
| 5,742,785 | A | * | 4/1998 | Stone et al. ................. 712/217 |
| 5,835,764 | A | * | 11/1998 | Platt et al. .................... 718/101 |
| 5,940,827 | A | | 8/1999 | Hapner et al. .................. 707/8 |
| 5,974,438 | A | | 10/1999 | Neufeld ....................... 718/104 |
| 6,021,480 | A | | 2/2000 | Pettey ......................... 711/201 |

(Continued)

FOREIGN PATENT DOCUMENTS

WO   WO 01 93028 A2   12/2001

(Continued)

OTHER PUBLICATIONS

Publication: "Speculative Synchronization: Applying Thread-Level Speculation to Explicitly Parallel Applications" by Jose F. Martinez and Josep Torrellas, Dept. of Computer Science, University of Illinois at Urbana-Champaign, Urbana, IL 61801 USA, http://iacoma.cs.uiuc.edu, XP-002285169, published in ASPLOS X, Oct. 2002, pp. 18-29.

(Continued)

*Primary Examiner*—Eddie P Chan
*Assistant Examiner*—Robert E Fennema
(74) *Attorney, Agent, or Firm*—Park, Vaughan & Fleming LLP

(57) ABSTRACT

One embodiment of the present invention provides a system that supports executing a fail instruction, which terminates transactional execution of a block of instructions. During operation, the system facilitates transactional execution of a block of instructions within a program, wherein changes made during the transactional execution are not committed to the architectural state of the processor until the transactional execution successfully completes. If a fail instruction is encountered during this transactional execution, the system terminates the transactional execution without committing results of the transactional execution to the architectural state of the processor.

24 Claims, 6 Drawing Sheets

U.S. PATENT DOCUMENTS

| | | | |
|---|---|---|---|
| 6,185,577 B1 | 2/2001 | Nainani et al. | |
| 6,360,220 B1 | 3/2002 | Forin | 707/8 |
| 6,460,124 B1 | 10/2002 | Kagi et al. | 711/163 |
| 6,578,033 B1 | 6/2003 | Singhal et al. | 707/8 |
| 6,681,311 B2 | 1/2004 | Gaskins et al. | 711/203 |
| 6,918,012 B2 | 7/2005 | Venkitakrishnan et al. | 711/150 |
| 6,941,449 B2 | 9/2005 | Ross | 712/35 |
| 2002/0087810 A1 | 7/2002 | Boatright et al. | 711/145 |
| 2002/0178349 A1 | 11/2002 | Shibayama et al. | 712/235 |
| 2003/0066056 A1 | 4/2003 | Petersen et al. | 717/137 |
| 2003/0079094 A1 | 4/2003 | Rajwar et al. | 711/150 |
| 2004/0162948 A1 | 8/2004 | Tremblay et al. | 711/137 |
| 2004/0162967 A1 | 8/2004 | Tremblay et al. | 712/228 |
| 2004/0186970 A1 | 9/2004 | Kekre et al. | 711/62 |
| 2004/0187123 A1 | 9/2004 | Tremblay et al. | 718/100 |

FOREIGN PATENT DOCUMENTS

| | | |
|---|---|---|
| WO | WO 03/054693 | 7/2003 |

OTHER PUBLICATIONS

Publication: "Speculative Lock Elision: Enabling Highly Concurrent Multithreaded Execution" by Ravi Rajwar and James R. Goodman, Computer Sciences Department, University of Wisconsin-Madison, Madison, WI 53706 USA, rajwar@cs.wisc.edu, XP-001075852, published in IEEE Journal Jan. 12, 2001, pp. 294-305.

Publication: "Transactional Memory: Architectural Support for Lock-Free Data Structures" by Maurice Herlihy, Digital Equip. Corp. Cambridge Research Laboratory, Cambridge, MA 02139, herlihy@crl.dec.com and J. Eliot B. Moss, Dept. of Computer Science, University of Massachusetts, Amherst, MA 01003, moss@cs.umass.edu, XP-000380375, published in Computer Architecture News, May 21, 1993, pp. 289-300.

Publication: "Enhancing Software Reliability with Speculative Threads" by Jeffrey Oplinger and Monica S. Lam, Computer Systems Laboratory, Stanford University, jeffop@stanford.edu, XP-002285168 published in ASPLOS X, Oct. 2002, pp. 184-196.

Publication entitled "Speculation-Based Techniques for Transaction Lock-Free Execution of Lock-Based Programs", by Ravi Rajwar, Online! 2002, XP002286237, Retrieved from the internet: URL:http://bbcr.uwaterloo.ca/ {brecht/courses/856/readings-new/rajwar02speculationsbased.pdf.

Publication entitled "Checkpoint Processing and Recovery: Towards Scalable Large Instruction Window Processors", by Haitham Akkary et al., Proceedings of th e 36th International Symporuim on Microarchitecture, 2003, IEEE.

Publication entitled "Multiple Reservations and the Oklahoma Update", by Janice M. Stone et al., IEEE Parallel & Distributed Technology, Nov. 1993, pp. 58-71.

Publication entitled "Improving the Throughput of Synchronization by Insertion of Delays", by Ravi Rajwar et al. Proceedings of the Sixth International Symposuim on High-Performance Computer Architecture, Jan. 8-12, 2000, pp. 168-179.

Publication entitled "Checkpoint Processing and Recovery: An Efficient, Scalable Alternative to Reorder Buffers" Haitham Akkary et al. IEEE Computer Society, Nov.-Dec. 2003, pp. 11-19.

Publication entitled "Multi-view Memory to Support OS Locking For Transaction Sytemss", P. Bodorik et al., IEEE, 1997, pp. 309-318.

Publication entitled "Indexing for Multiversion Locking: Alternatives and Performance Evaluation", Paul M. Bober et al, IEEE Transactions on Knowledge and Data Engineering, vol. 9, No. 1, Jan.-Feb. 1997, pp. 68-84.

Publication entitled: "Transactional Execution: Toward Reliable, High-Performance Multithreading" by Ravi Rajwar et al. IEEE Computer Society, Nov.-Dec. 2003, pp. 117-125.

"Structured Computer Organization" by Andrew S. Tanenbaum, Published 1999, pp. 5, 7-8.

"The Transaction Concept: Virtues and Limitations" by Jim Gray. Pro. Int'l Conf. Very Large Databases, Morgan Kaufman, 1981. pp. 144-154.

"Toward Efficient and Robust Software Speculative Parallelization on Multiprocessors" by Marcelo Cintra and Diego R. Lianos, PPoPP' 03 Jun. 11-13, 2003 ACM 1-58113-588-2/03/0006 pp. 13-24.

"Microsoft Computer Dictionary" Fifth Edition, pub 2002, p. 378.

"The Potential for Using Thread-Level Data Speculation to Facilitate Automatic Parallelization", by J. Gregory Steffan et al., 1998, IEEE, pp. 2-13.

"Hybrid Hardware/Software Transactional Memory", by Mark Moir et al., XP-002407376.

"Hybrid Transactional Memory", by Mark Moir, Sun Microsystems, Inc. 2005, XP-002407375.

"Lock-Based Programs and Transactional Lock-Free Execution", by Ravi Rajwar et al., University of Wisconsin-Madison Technical Report #1440, Apr. 2002.

"Speculative Locks for Concurrent Execution of Critical Sections in Shared-Memory Multiprocessors", by Jose F Martinez et al., Workshop on Memory Performance Issues, International Symposium on Computer Architecture, Jun. 2001.

"Speculative Locks for Concurrent Execution of Critical Sections in Shared-Memory Multiprocessors", by Jose F. Martinez et al., Technical Report UIUCDCS-R-2001-2202, Feb. 2001.

"Transactional Lock-Free Execution of Lock-Based Programs", by Ravi Rajwar, Proceedings of the Tenth International Conference on Architectural Support for Programming Languages and Operating Systems, Oct. 6-Oct. 9, 2002, San Jose, CA.

* cited by examiner

OLD VERSION                NEW VERSION

⋮                          ⋮

ACQUIRE LOCK                  STE          <FAIL PC>

⋮                          ⋮

CRITICAL      ⟹            CRITICAL
SECTION                     SECTION

⋮                          ⋮

RELEASE LOCK                COMMIT

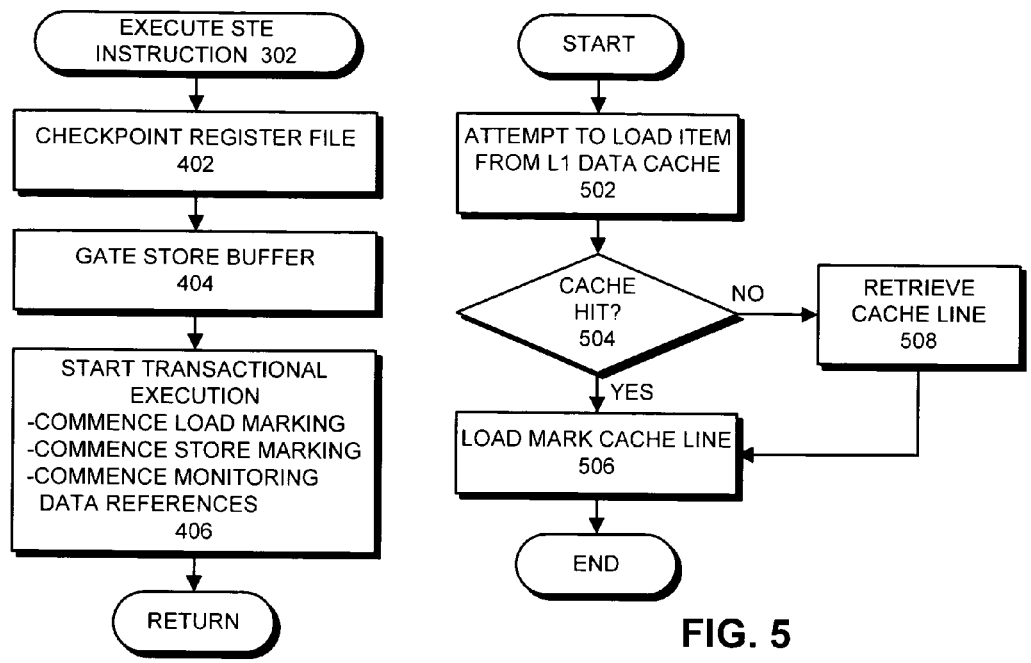
FIG. 4
FIG. 5
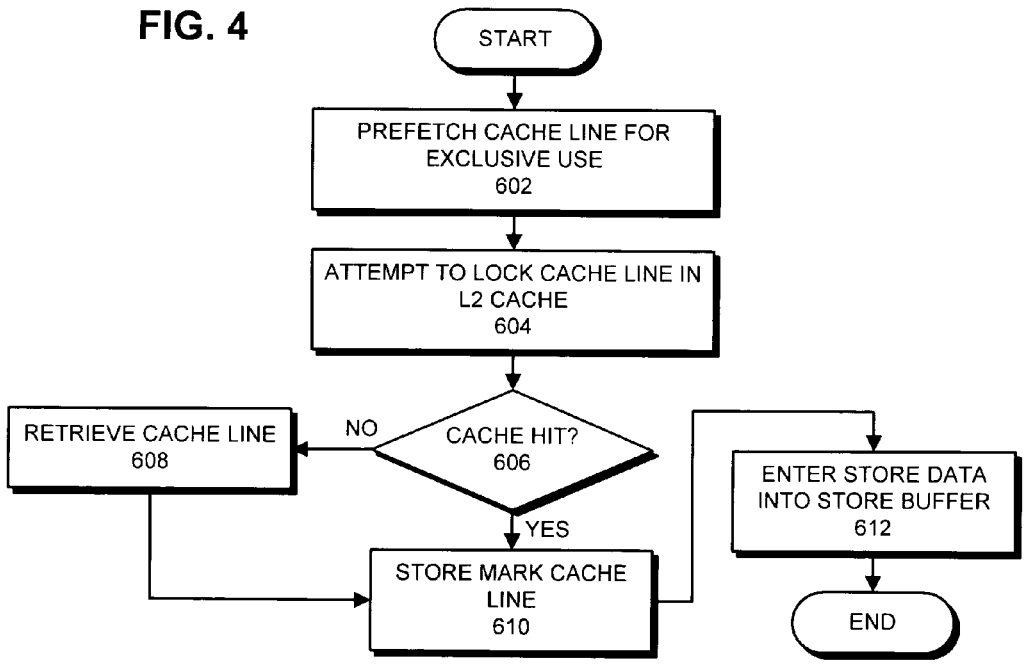
FIG. 6

STE INSTRUCTION 900

| OP CODE 902 | BRANCH TARGET 903 |

COMMIT INSTRUCTION 910

| OP CODE 912 | 000000000000000000 |

FAIL INSTRUCTION 920

| OP CODE 922 | ALT BRANCH TARGET 923 |

FIG. 9

FAIL INSTRUCTION TO SUPPORT TRANSACTIONAL PROGRAM EXECUTION

RELATED APPLICATIONS

This application hereby claims priority under 35 U.S.C. §119 to U.S. Provisional Patent Application No. 60/447,128, filed on 13 Feb. 2003, entitled "Transactional Memory," by inventors Shailender Chaudhry, Marc Tremblay and Quinn Jacobson.

This application is also related to a non-provisional U.S. patent application entitled, "Start Transactional Execution (STE) Instruction to Support Transactional Program Execution," by inventors Shailender Chaudhry Marc Tremblay and Quinn A. Jacobson, filed on the same day as the instant application.

This application is also related to a non-provisional U.S. patent application entitled, "Commit Instruction to Support Transactional Program Execution," by inventors Shailender Chaudhry Marc Tremblay and Quinn A. Jacobson, filed on the same day as the instant application.

BACKGROUND

1. Field of the Invention

The present invention relates to techniques for improving the performance of computer systems. More specifically, the present invention relates to a method and an apparatus for avoiding the overhead involved in using locks by transactionally executing critical sections of code.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase the performance of numerous applications. However, as microprocessor performance continues to increase, the time spent synchronizing between threads (processes) is becoming a large fraction of overall execution time. In fact, as multi-threaded applications begin to use even more threads, this synchronization overhead becomes the dominant factor in limiting application performance.

From a programmer's perspective, synchronization is generally accomplished through the use locks. A lock is typically acquired before a thread enters a critical section of code, and is released after the thread exits the critical section. If another thread wants to enter the same critical section, it must acquire the same lock. If it is unable to acquire the lock, because a preceding thread has grabbed the lock, the thread must wait until the preceding thread releases the lock. (Note that a lock can be implemented in a number of ways, such as through atomic operations or semaphores.)

Unfortunately, the process of acquiring a lock and the process of releasing a lock are very time-consuming in modem microprocessors. They involve atomic operations, which typically flush the load buffer and store buffer, and can consequently require hundreds, if not thousands, of processor cycles to complete.

Moreover, as multi-threaded applications use more threads, more locks are required. For example, if multiple threads need to access a shared data structure, it is impractical for performance reasons to use a single lock for the entire data structure. Instead, it is preferable to use multiple fine-grained locks to lock small portions of the data structure. This allows multiple threads to operate on different portions of the data structure in parallel. However, it also requires a single thread to acquire and release multiple locks in order to access different portions of the data structure.

In some cases, locks are used when they are not required. For example, many applications make use of "thread-safe" library routines that use locks to ensure that they are "thread-safe" for multi-threaded applications. Unfortunately, the overhead involved in acquiring and releasing these locks is still incurred, even when the thread-safe library routines are called by a single-threaded application.

Applications typically use locks to ensure mutual exclusion within critical sections of code. However, in many cases threads will not interfere with each other, even if they are allowed to execute a critical section simultaneously. In these cases, mutual exclusion is used to prevent the unlikely case in which threads actually interfere with each other. Consequently, in these cases, the overhead involved in acquiring and releasing locks is largely wasted.

Hence, what is needed is a method and an apparatus that reduces the overhead involved in manipulating locks when accessing critical sections of code.

Although compilers and special-purpose hardware can be developed to automatically solve some of the above-described problems, in many cases, it is desirable to provide instruction-level support to enable programmers and compilers to control such solutions.

Hence, what is needed is a method and an apparatus that provides instruction-level support to solve the above-described problems.

SUMMARY

One embodiment of the present invention provides a system that supports a start transactional execution (STE) instruction, wherein the STE instruction marks the beginning of a block of instructions to be executed transactionally. Upon encountering the STE instruction during execution of a program, the system commences transactional execution of a block of instructions following the STE instruction. Changes made during this transactional execution are not committed to the architectural state of the processor until the transactional execution successfully completes (which means that it completes without violating the memory consistency model or without other errors).

In a variation on this embodiment, the STE instruction specifies an action to take if transactional execution of the block of instructions fails.

In a further variation, the action to take can include branching to a location specified by the STE instruction.

In a further variation, the action to take can include acquiring a lock on the block of instructions.

In a further variation, the action to take can include setting state information within the processor to indicate a failure during transactional execution of the block of instructions. This enables other software executed by the processor to manage the failure.

In a variation on this embodiment, potentially interfering data accesses from other processes are allowed to proceed during the transactional execution of the block of instructions.

In a variation on this embodiment, if the transactional execution completes without encountering an interfering data access from another process or other type of failure, the system atomically commits changes made during the transactional execution to the architectural state of the processor, and resumes normal non-transactional execution.

In a variation on this embodiment, if an interfering data access from another process is encountered during the transactional execution, the system discards changes made during the transactional execution, and attempts to re-execute the block of instructions.

In a variation on this embodiment, the block of instructions to be executed transactionally comprises a critical section.

In a variation on this embodiment, commencing transactional execution of the block of instructions involves saving the state of processor registers. It also involves configuring the processor to mark cache lines during loads and stores that take place during transactional execution. It additionally involves configuring the processor to continually monitor data references from other threads to detect interfering data references.

In a variation on this embodiment, the STE instruction is a native machine code instruction of the processor.

In a variation on this embodiment, the STE instruction is defined in a platform-independent programming language.

One embodiment of the present invention provides a system that facilitates executing a commit instruction, which marks the end of a block of instructions to be executed transactionally. Upon encountering the commit instruction during execution of a program, the system successfully completes transactional execution of the block of instructions preceding the commit instruction. Changes made during the transactional execution are not committed to the architectural state of the processor until the transactional execution successfully completes.

In a variation on this embodiment, the system successfully completes the transactional execution by atomically committing changes made during the transactional execution, and resuming normal non-transactional execution.

In a further variation, while committing changes made during the transactional execution, the system commits register file changes made during transactional execution and clears load marks from cache lines. The system also treats store-marked cache lines as locked, thereby causing other processes to wait to access the store-marked cache lines. The system subsequently commits store buffer entries generated during transactional execution to memory, which involves unmarking, and thereby unlocking, corresponding store-marked cache lines.

In a variation of the commit instruction, after committing changes made during the transactional execution, the system commences transactional execution of the block of instructions following the commit instruction.

In a variation on this embodiment, the commit instruction is a native machine code instruction of the processor.

In a variation on this embodiment, the commit instruction is defined in a platform-independent programming language.

One embodiment of the present invention provides a system that supports executing a fail instruction, which terminates transactional execution of a block of instructions. During operation, the system facilitates transactional execution of a block of instructions within a program, wherein changes made during the transactional execution are not committed to the architectural state of the processor until the transactional execution successfully completes. If a fail instruction is encountered during this transactional execution, the system terminates the transactional execution without committing results of the transactional execution to the architectural state of the processor.

In a variation on this embodiment, terminating the transactional execution involves discarding changes made during the transactional execution.

In a variation on this embodiment, while discarding changes made during the transactional execution, the system discards register file changes and clears load marks from cache lines. The system also drains store buffer entries generated during transactional execution, and clears store marks from cache lines.

In a variation on this embodiment, while terminating the transactional execution, the system branches to a location specified by a corresponding start transactional execution (STE) instruction.

In a variation on this embodiment, while terminating the transactional execution, the system branches to a location specified by the fail instruction.

In a variation on this embodiment, while terminating the transactional execution, the system attempts to re-execute the block of instructions.

In a variation on this embodiment, the fail instruction is a native machine code instruction of the processor.

In a variation on this embodiment, the fail instruction is defined in a platform-independent programming language.

BRIEF DESCRIPTION OF THE FIGURES

FIG. 2 illustrates how a critical section is executed in accordance with an embodiment of the present invention.

FIG. 4 presents a flow chart illustrating a start transactional execution (STE) operation in accordance with an embodiment of the present invention.

FIG. 5 presents a flow chart illustrating how load marking is performed during transactional execution in accordance with an embodiment of the present invention.

FIG. 6 presents a flow chart illustrating how store marking is performed during transactional execution in accordance with an embodiment of the present invention.

FIG. 9 illustrates instructions to support transactional execution in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
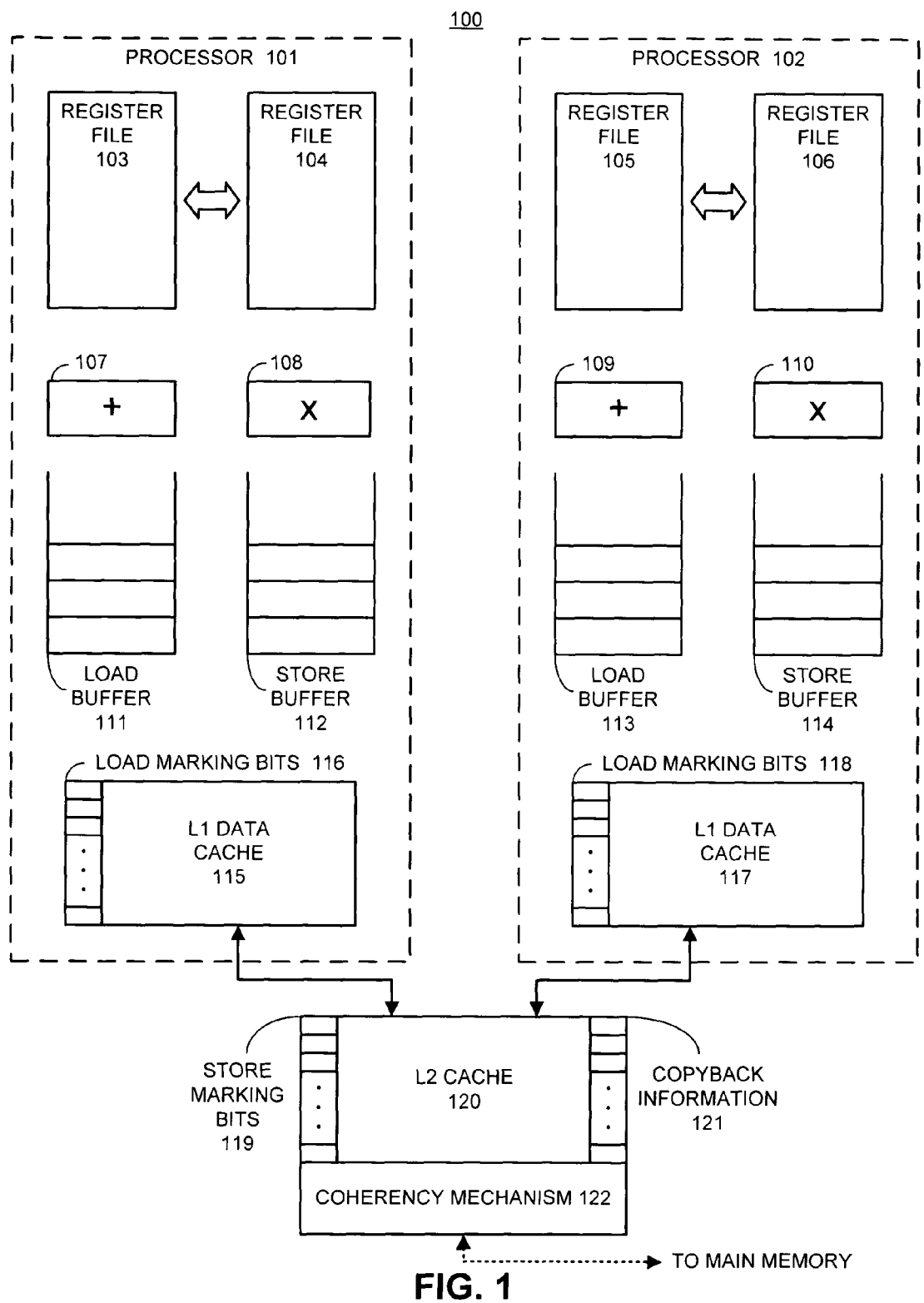
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As is illustrated in FIG. 1, computer system 100 includes processors 101 and level 2 (L2) cache 120, which is coupled to main memory (not shown). Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that each line in L1 data cache 115 includes a "load marking bit," which indicates that a data value from the line has been loaded during transactional execution. This load marking bit is used to determine whether any interfering memory references take place during transactional execution as is described below with reference to FIGS. 3-8. Processor 101 also includes an L1 instruction cache (not shown).

Note that load marking does not necessarily have to take place in L1 data cache 115. In general load marking can take place at any level cache, such as L2 cache 120. However, for performance reasons, the load marking takes place at the cache level that is closest the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where the current version of the cache line must first be retrieved from another processor.

Each line in L2 cache 120 includes a "store marking bit," which indicates that a data value has been stored to the line during transactional execution. This store marking bit is used to determine whether any interfering memory references take place during transactional execution as is described below with reference to FIGS. 3-8. Note that store marking does not necessarily have to take place in L2 cache 120.

Ideally, the store marking takes place in the cache level closest to the processor where cache lines are coherent. For write-through L1 data caches, writes are automatically propagated to L2 cache 120. However, if an L1 data cache is a write-back cache, we perform store marking in the L1 data cache. (Note that the cache coherence protocol ensures that any other processor that subsequently modifies the same cache line will retrieve the cache line from the L1 cache, and will hence become aware of the store mark.)

Executing a Critical Section

FIG. 2 illustrates how a critical section is executed in accordance with an embodiment of the present invention. As is illustrated in the left-hand side of FIG. 2, a process that executes a critical section typically acquires a lock associated with the critical section before entering the critical section. If the lock has been acquired by another process, the process may have to wait until the other process releases the lock. Upon leaving the critical section, the process releases the lock. (Note that the terms "thread" and "process" are used interchangeably throughout this specification.)

A lock can be associated with a shared data structure. For example, before accessing a shared data structure, a process can acquire a lock on the shared data structure. The process can then execute a critical section of code that accesses the shared data structure. After the process is finished accessing the shared data structure, the process releases the lock.

In contrast, in the present invention, the process does not acquire a lock, but instead executes a start transactional execution (STE) instruction before entering the critical section. If the critical section is successfully completed without interference from other processes, the process performs a commit operation, to commit changes made during transactional execution. This sequence of events is described in more detail below with reference to FIGS. 3-8.

Note that in one embodiment of the present invention a compiler replaces lock-acquiring instructions with STE instructions, and also replaces corresponding lock releasing instructions with commit instructions. (Note that there may not be a one-to-one correspondence between replaced instructions. For example, a single lock acquisition operation comprised of multiple instructions may be replaced by a single STE instruction.) The above discussion presumes that the processor's instruction set has been augmented to include an STE instruction and a commit instruction. These instructions are described in more detail below with reference to FIGS. 3-9.

Transactional Execution Process

Figure 3:
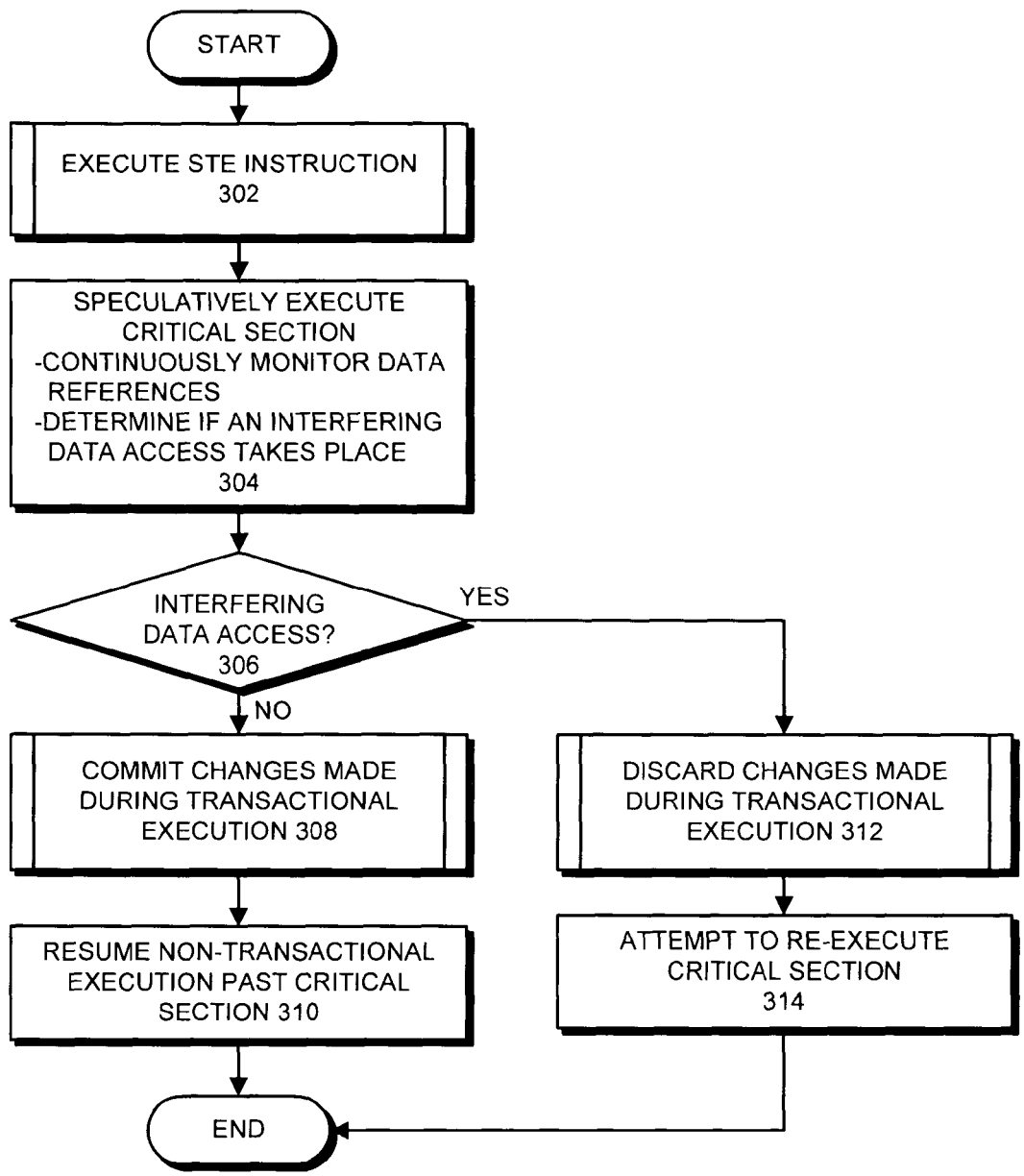
FIG. 3 presents a flow chart illustrating the transactional execution process in accordance with an embodiment of the present invention.

FIG. 3 presents a flow chart illustrating how transactional execution takes place in accordance with an embodiment of the present invention. A process first executes an STE instruction prior to entering of a critical section of code (step 302). Next, the system transactionally executes code within the critical section, without committing results of the transactional execution (step 304).

During this transactional execution, the system continually monitors data references made by other processes, and determines if an interfering data access (or other type of failure) takes place during transactional execution. If not, the system atomically commits all changes made during transactional execution (step 308) and then resumes normal non-transactional execution of the program past the critical section (step 310).

On the other hand, if an interfering data access is detected, the system discards changes made during the transactional execution (step 312), and attempts to re-execute the critical section (step 314).

In one embodiment of the present invention, the system attempts the transactionally re-execute the critical section zero, one, two or more times. If these attempts are not successful, the system reverts back to the conventional technique of acquiring a lock on the critical section before entering the critical section, and then releasing the lock after leaving the critical section.

Note that an interfering data access can include a store by another process to a cache line that has been load marked by the process. It can also include a load or a store by another process to a cache line that has been store marked by the process.

Also note that circuitry to detect interfering data accesses can be easily implemented by making minor modifications to conventional cache coherence circuitry. This conventional cache coherence circuitry presently generates signals indicating whether a given cache line has been accessed by another processor. Hence, these signals can be used to determine whether an interfering data access has taken place.

Starting Transactional Execution

FIG. 4 presents a flow chart illustrating a start transactional execution (STE) operation in accordance with an embodiment of the present invention. This flow chart illustrates what takes place during step 302 of the flow chart in FIG. 3. The system starts by checkpointing the register file (step 402). This can involve performing a flash copy operation from register file 103 to register file 104 (see FIG. 1). In addition to checkpointing register values, this flash copy can also checkpoint various state registers associated with the currently executing process. In general, the flash copy operation checkpoints enough state to be able to restart the corresponding thread.

At the same time the register file is checkpointed, the STE operation also causes store buffer 112 to become "gated" (step 404). This allows existing entries in store buffer to propagate to the memory sub-system, but prevents new store buffer entries generated during transactional execution from doing so.

The system then starts transactional execution (step 406), which involves load-marking and store-marking cache lines, if necessary, as well as monitoring data references in order to detect interfering references.

Load Marking Process

FIG. 5 presents a flow chart illustrating how load marking is performed during transactional execution in accordance with an embodiment of the present invention. During transactional execution of a critical section, the system performs a load operation. In performing this load operation if the load operation has been identified as a load operation that needs to be load-marked, system first attempts to load a data item from L1 data cache 115 (step 502). If the load causes a cache hit, the system "load marks" the corresponding cache line in L1 data cache 115 (step 506). This involves setting the load marking bit for the cache line. Otherwise, if the load causes a cache miss, the system retrieves the cache line from further levels of the memory hierarchy (step 508), and proceeds to step 506 to load mark the cache line in L1 data cache 115.

Store Marking Process

FIG. 6 presents a flow chart illustrating how store marking is performed during transactional execution in accordance with an embodiment of the present invention. During transactional execution of a critical section, the system performs a store operation. If this store operation has been identified as a store operation that needs to be store-marked, the system first prefetches a corresponding cache line for exclusive use (step 602). Note that this prefetch operation will do nothing if the line is already located in cache and is already in an exclusive use state.

Since in this example L1 data cache 115 is a write-through cache, the store operation propagates through L1 data cache 115 to L2 cache 120. The system then attempts to lock the cache line corresponding to the store operation in L2 data cache 115 (step 604). If the corresponding line is in L2 cache 120 (cache hit), the system "store marks" the corresponding cache line in L2 cache 120 (step 610). This involves setting the store marking bit for the cache line. Otherwise, if the corresponding line is not in L2 cache 120 (cache miss), the system retrieves the cache line from further levels of the memory hierarchy (step 608) and then proceeds to step 610 to store mark the cache line in L2 cache 120.

Next, after the cache line is store marked in step 610, the system enters the store data into an entry of the store buffer 112 (step 612). Note that this store data will remain in store buffer 112 until a subsequent commit operation takes place, or until changes made during the transactional execution are discarded.

Note that a cache line that is store marked by a given thread can be read by other threads. Note that this may cause the given thread to fail while the other threads continue.

Commit Operation

Figure 7:
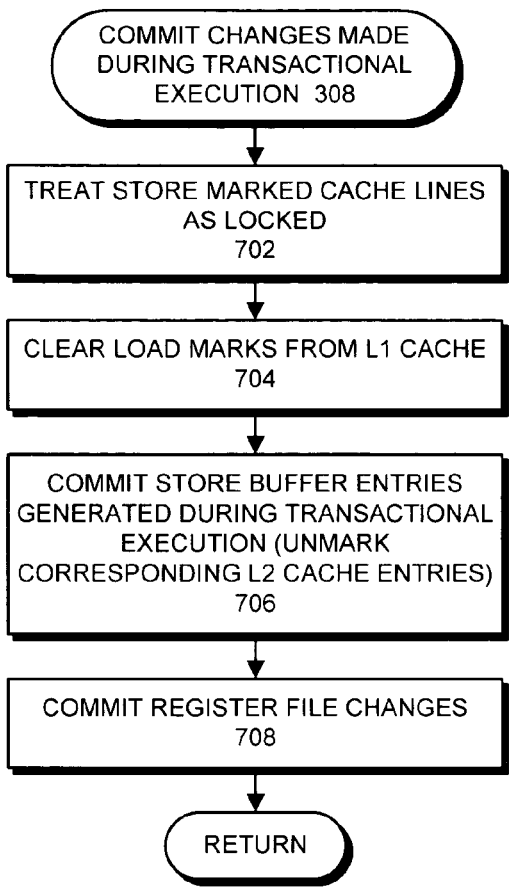
FIG. 7 presents a flow chart illustrating how a commit operation is performed in accordance with an embodiment of the present invention.

FIG. 7 presents a flow chart illustrating how a commit operation is performed after transactional execution completes successfully in accordance with an embodiment of the present invention. This flow chart illustrates what takes place during step 308 of the flow chart in FIG. 3.

The system starts by treating store-marked cache lines as though they are locked (step 702). This means other processes that request a store-marked line must wait until the line is no longer locked before they can access the line. This is similar to how lines are locked in conventional caches.

Next, the system clears load marks from L1 data cache 115 (step 704).

The system then commits entries from store buffer 112 for stores that are identified as needing to be marked, which were generated during the transactional execution, into the memory hierarchy (step 706). As each entry is committed, a corresponding line in L2 cache 120 is unlocked.

The system also commits register file changes (step 708). For example, this can involve functionally performing a flash copy between register file 103 and register file 104 in the system illustrated in FIG. 1.

Discarding Changes

Figure 8:
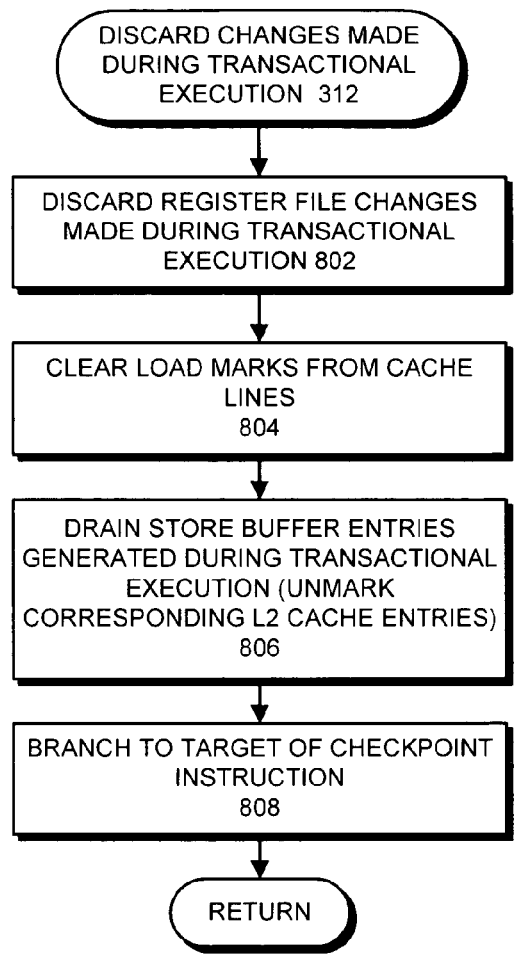
FIG. 8 presents a flow chart illustrating how changes are discarded after transactional execution completes unsuccessfully in accordance with an embodiment of the present invention.

FIG. 8 presents a flow chart illustrating how changes are discarded after transactional execution completes unsuccessfully in accordance with an embodiment of the present invention. This flow chart illustrates what takes place during step 312 of the flow chart in FIG. 3. The system first discards register file changes made during the transactional execution (step 802). This can involve either clearing or simply ignoring register file changes made during transactional execution. This is easy to accomplish because the old register values were checkpointed prior to commencing transactional execution. The system also clears load marks from cache lines in L1 data cache 115 (step 804), and drains store buffer entries generated during transactional execution without committing them to the memory hierarchy (step 806). At the same time, the system unmarks corresponding L2 cache lines. Finally, in one embodiment of the present invention, the system branches to a target location specified by the STE instruction (step 808). The code at this target location attempts to re-execute the critical section as is described above with reference to step 314 of FIG. 1.

STE Instruction

Referring to FIG. 9, STE instruction 900 marks the beginning of a block of instructions to be executed transactionally. When STE instruction 900 is encountered during program execution, the system commences transactional execution of the block of instruction immediately following STE instruction 900. Changes made during this transactional execution are not committed to the architectural state of the processor until the transactional execution successfully completes, at which point all of the changes are committed in one atomic operation as described above with reference to FIG. 7.

Note that STE instruction 900 includes an operation code (op code) 902, which identifies the STE instruction and a branch target 903. Branch target 903 contains a PC-relative branch target that specifies where to jump to when a failure occurs during transactional execution.

Instead of jumping to a branch target during a failure, the system can alternatively take other actions, such as automatically attempting the re-execute the block of instructions, or attempting to acquire a lock on the block of instructions and then re-executing the block of instructions. The system can also set state information within the processor to indicate a failure during transactional execution of the block of instructions. This enables other software executed by the processor to manage the failure.

STE instruction 900 is somewhat unique in that its semantics are defined by what happens after the instruction, in a following transactionally executed block of code. If a commit instruction is successfully reached, STE instruction 900 behaves as if it were a NOOP. In this case, the code in the critical section following STE instruction 900 is successfully completed, and execution resumes with the code following the commit instruction.

On the other hand, if a commit instruction is not successfully reached, the STE instruction behaves as if it were an annulling "branch always" instruction that causes a status register to be updated with a value indicating the reason for failure. In this case, no visible effect remains from the instructions in the unsuccessful critical section.

Failures can arise from a number of sources. For example, in one embodiment of the present invention, transactional execution is considered to have failed if any of the following events occur before reaching a commit instruction: (1) a fail instruction is reached; (2) an instruction not allowed in critical sections is encountered, such as FLUSH, MEMBAR, DONE, RETRY, and any write of an ASR register, privileged register or internal ASI register; (3) a trap occurs; (4) an interrupt occurs; (5) a coherent load or store operation from another processor may have caused the sequence of loads and stores within the critical section to not appear atomic to other processors; (6) the processor runs out of hardware resources to buffer store operations from the critical section; (7) the processor runs out of hardware resources to track load operations from the critical section; and (8) too many stalling operations are encountered. This can be caused, for instance, by too many operations generating cache misses.

Commit Instruction

The commit instruction 910 marks the end of a block of instructions to be executed transactionally. Commit instruction 910 is used in conjunction with STE instruction 900 to delineate a block of instructions to be transactionally executed, such as a critical section. When commit instruction 910 is encountered during execution of a program, the system completes transactional execution of the block of instruction immediately preceding the commit instruction. This involves atomically committing changes made during the transactional execution to the architectural state of the processor as is described above with reference to FIG. 7. The system also resumes normal non-transactional execution.

If a commit instruction is reached, and there was no preceding STE instruction, the commit instruction is treated as a NOOP.

Referring to FIG. 9, the commit instruction 910 includes an op code 912, which identifies the instruction, and no operand is required.

In a variation of the commit instruction, after committing changes made during the transactional execution, the system resumes transactional execution of instructions following the commit instruction. Hence, instead of terminating transactional execution, the system commits the changes made during transactional execution thus far and resumes transactional execution.

Fail Instruction

Fail instruction 920 terminates transactional execution without committing results of the transactional execution to the architectural state of the processor. Hence, fail instruction 920 directs the hardware to revert back to the program state at the point of the preceding STE instruction. This involves discarding changes made during transactional execution as is described above with reference to FIG. 8.

After the changes are discarded, the system can perform a number of different actions. In one embodiment of the present invention, the system branches to a branch target specified by a corresponding start transactional execution (STE) instruction. In another embodiment, the system branches to a location specified by the fail instruction itself, such as alternative branch target 923 in fail instruction 920 in FIG. 3. In yet another embodiment, the system attempts to re-execute the block of instructions.

Note that instead of immediately causing the transactional execution to fail, the fail instruction can simply set state information within the processor to indicate that a failure has occurred, and the actual failure actions can take place later, for example upon encountering a subsequent commit instruction.

If a fail instruction is reached, and there was no preceding STE instruction, the fail instruction is treated as a NOOP.

Referring to FIG. 9, the fail instruction 920 includes an op code 912, which identifies the instruction, and possibly an alternative branch target 923.

Note that to facilitate "transactional execution" software can specify a speculative region of code, wherein selected memory accesses may be committed atomically to the architectural state of the processor as a transaction.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a fail instruction to facilitate transactional execution on a processor, comprising:

transactionally executing a block of instructions within a program;

wherein changes made during the transactional execution are not committed to the architectural state of the processor unless the transactional execution successfully completes; and if the fail instruction is encountered during the transactional execution, setting state information within the processor to indicate that the fail instruction was encountered and continuing transactional execution; and performing one or more failure actions based on the state information at a later time.

2. The method of claim 1, wherein performing one or more failure actions involves terminating the transactional execution and discarding changes made during the transactional execution.

3. The method of claim 2, wherein discarding changes made during the transactional execution involves:

discarding register file changes made during the transactional execution;

clearing load marks from cache lines;

draining store buffer entries generated during transactional execution; and clearing store marks from cache lines.

4. The method of claim 2, wherein terminating the transactional execution additionally involves attempting to re-execute the block of instructions.

5. The method of claim 1, wherein if the transactional execution of the block of instructions is successfully completed, the method further comprises:

atomically committing changes made during the transactional execution; and resuming normal non-transactional execution.

6. The method of claim 1, wherein potentially interfering data accesses from other processes are allowed to proceed during the transactional execution of the block of instructions.

7. The method of claim 1, wherein if an interfering data access from another process is encountered during the transactional execution, the method further comprises:
   discarding changes made during the transactional execution; and
   attempting to re-execute the block of instructions.

8. The method of claim 1, wherein the block of instructions to be executed transactionally comprises a critical section.

9. The method of claim 1, wherein the fail instruction is a native machine code instruction of the processor.

10. The method of claim 1, wherein the fail instruction is defined in a platform-independent programming language.

11. The method of claim 1, wherein performing one or more failure actions based on the state information at the later time involves performing the failure actions when a commit instruction is encountered at an end of the transaction.

12. A computer system that supports a fail instruction to facilitate transactional execution, comprising:
   a processor; and
   an execution mechanism within the processor;
   wherein the execution mechanism is configured to transactionally execute a block of instructions within a program;
   wherein changes made during the transactional execution are not committed to the architectural state of the processor unless the transactional execution successfully completes; and
   wherein if the fail instruction is encountered during the transactional execution, the execution mechanism is configured to:
   set state information within the processor to indicate that the fail instruction was encountered and continue transactional execution; and
   perform one or more failure actions based on the state information at a later time.

13. The computer system of claim 12, wherein while performing the one or more failure actions, the execution mechanism is configured to terminate the transactional execution and discard changes made during the transactional execution.

14. The computer system of claim 13, wherein while discarding changes made during the transactional execution, the execution mechanism is configured to:
   discard register file changes made during the transactional execution;
   clear load marks from cache lines;
   drain store buffer entries generated during transactional execution; and to
   clear store marks from cache lines.

15. The computer system of claim 13, wherein while terminating the transactional execution, the execution mechanism is additionally configured to attempt to re-execute the block of instructions.

16. The computer system of claim 12, wherein if the transactional execution of the block of instructions is successfully completed, the execution mechanism is configured to:
   atomically commit changes made during the transactional execution; and to
   resume normal non-transactional execution.

17. The computer system of claim 12, wherein the computer system is configured to allow potentially interfering data accesses from other processes to proceed during the transactional execution of the block of instructions.

18. The computer system of claim 12, wherein if an interfering data access from another process is encountered during the transactional execution, the execution mechanism is configured to:
   discard changes made during the transactional execution; and to
   attempt to re-execute the block of instructions.

19. The computer system of claim 12, wherein the block of instructions to be executed transactionally comprises a critical section.

20. The computer system of claim 12, wherein the fail instruction is a native machine code instruction of the processor.

21. The computer system of claim 12, wherein the fail instruction is defined in a platform-independent programming language.

22. The computer system of claim 12, wherein when performing the one or more failure actions at the later time, the execution mechanism is configured to perform the failure actions upon encountering a commit instruction at an end of the transaction.

23. A computing means that supports a fail instruction to facilitate transactional execution, comprising:
   a processing means; and
   an execution means within the processing means;
   wherein the execution means is configured to transactionally execute a block of instructions within a program;
   wherein changes made during the transactional execution are not committed to the architectural state of the processor unless the transactional execution successfully completes; and
   wherein if the fail instruction is encountered during the transactional execution, the execution means is configured to:
   set state information within the processor to indicate that the fail instruction was encountered and continue transactional execution; and
   perform one or more failure actions based on the state information at a later time.

24. The computing means of claim 23, wherein when performing the one or more failure actions at the later time, the execution means is configured to perform the failure actions upon encountering a commit instruction at an end of the transaction.

* * * * *